US011103054B2

(12) United States Patent
Altmann et al.

(10) Patent No.: US 11,103,054 B2
(45) Date of Patent: Aug. 31, 2021

(54) BRUSH HEAD FOR AN ORAL CARE IMPLEMENT

(71) Applicant: Braun GmbH, Kronberg (DE)

(72) Inventors: Niclas Altmann, Niddatal (DE); Ulrich Störkel, Bad Nauheim (DE); Bianka Becker-Salzsäuler, Liederbach (DE); Siegfried Bauernfeind, Frankfurt Am Main (DE)

(73) Assignee: Braun GmbH, Kronberg (DE)

( * ) Notice: Subject to any disclaimer, the term of this patent is extended or adjusted under 35 U.S.C. 154(b) by 15 days.

(21) Appl. No.: 16/159,416

(22) Filed: Oct. 12, 2018

(65) Prior Publication Data
US 2019/0125065 A1    May 2, 2019

(30) Foreign Application Priority Data
Nov. 2, 2017   (EP) ..................... 17199718

(51) Int. Cl.
*A46B 9/02*    (2006.01)
*A46B 9/04*    (2006.01)
(Continued)

(52) U.S. Cl.
CPC .............. *A46B 9/025* (2013.01); *A46B 9/028* (2013.01); *A46B 9/04* (2013.01); *A46B 9/06* (2013.01);
(Continued)

(58) Field of Classification Search
CPC ......... A46B 9/025; A46B 9/026; A46B 9/028; A46B 13/001; A46B 9/04; A46B 2200/1066
See application file for complete search history.

(56) References Cited

U.S. PATENT DOCUMENTS 8,621,698 B2 *  1/2014  Chenvainu ............. A46B 9/045
                                                    15/22.1
9,402,461 B2 *  8/2016  Brik ........................ A46B 9/04
(Continued)

FOREIGN PATENT DOCUMENTS

EP    2810581 A1    12/2014
EP    2810582 A1    12/2014

OTHER PUBLICATIONS

Weisstein, Eric W. "Stadium." From MathWorld—A Wolfram Web Resource. https://mathworld.wolfram.com/Stadium.html Accessed May 2021. (Year: 2021).*

(Continued)

*Primary Examiner* — Laura C Guidotti
(74) *Attorney, Agent, or Firm* — Vladimir Vitenberg

(57) ABSTRACT

A brush head for an oral care implement includes at least one (first) group of tufts extending from a mounting surface of a tuft carrier having a rotation axis. The tufts have a base end and a free end. The tufts of the first group are tufts having an extension in a circumferential direction about the rotation axis exceeding an extension in a radial direction. The tufts of the first group may be inclined with respect to the mounting surface in at least one direction. Each of the first-group tufts may comprise a first group of filaments and a second group of filaments, wherein the second-group filaments' free ends protrude beyond the first-group filaments' free ends.

21 Claims, 2 Drawing Sheets

Fig. 1

(51) Int. Cl.
  *A46B 9/06*   (2006.01)
  *A46B 13/00*  (2006.01)
  *A61C 17/34*  (2006.01)
  *A61C 17/32*  (2006.01)
(52) U.S. Cl.
  CPC ..... *A46B 13/001* (2013.01); *A46B 2200/1066* (2013.01); *A61C 17/32* (2013.01); *A61C 17/3436* (2013.01)

(56) References Cited

U.S. PATENT DOCUMENTS

| | | | |
|---|---|---|---|
| 10,219,611 B2* | 3/2019 | Simeth | A46D 1/0253 |
| 2014/0359958 A1* | 12/2014 | Jungnickel | A46B 9/06 |
| | | | 15/167.1 |
| 2015/0238004 A1 | 8/2015 | Brik et al. | |

OTHER PUBLICATIONS

Extended European Search Report and Search Opinion; Application Ser. No. 17199718.2; dated May 9, 2018; 7 pages.
International Search Report and Written Opinion; Application Ser. No. PCT/IB2018/058531; dated Feb. 12, 2019; 13 pages.

* cited by examiner

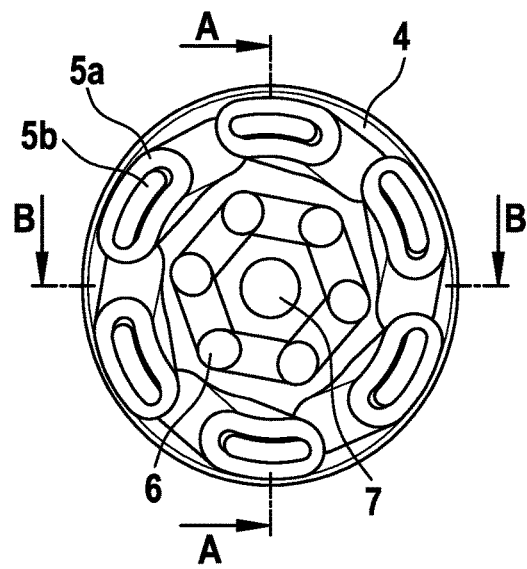
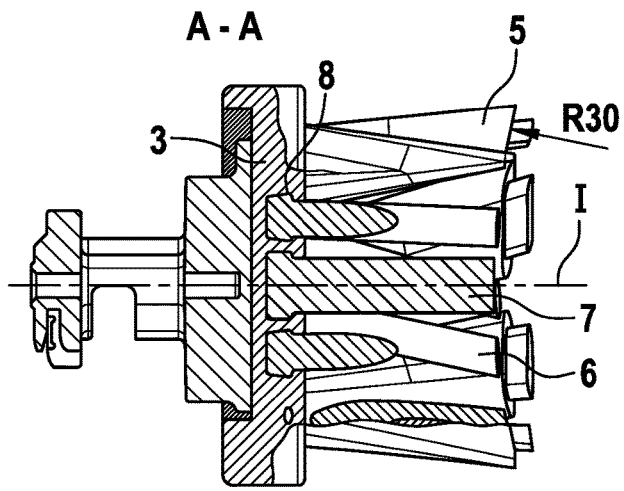
Fig. 2
Fig. 3
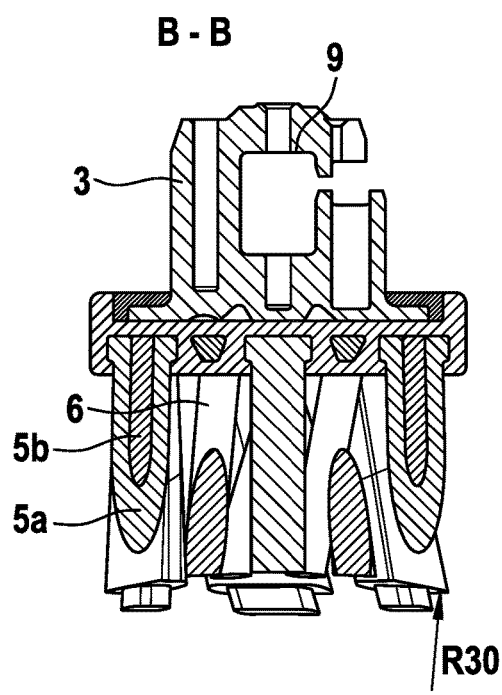
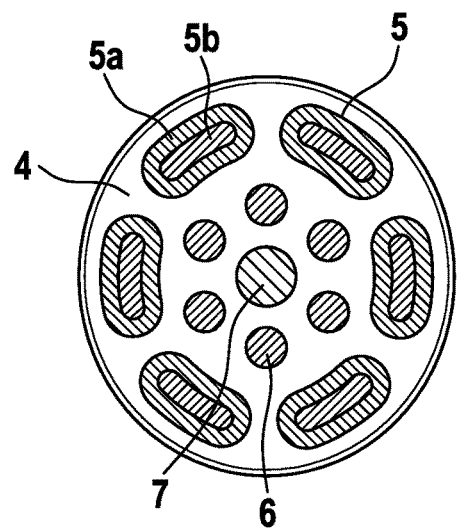
Fig. 4
Fig. 5

BRUSH HEAD FOR AN ORAL CARE IMPLEMENT

FIELD OF THE INVENTION

The present disclosure is concerned with a brush head for an oral care implement and in particular with such a brush head comprising at least one tuft having filaments of different types and being arranged on a mounting surface from which it extends. The mounting surface of the brush head is suitable to perform an oscillating rotary movement together with the at least one tuft.

BACKGROUND OF THE INVENTION

Tufts composed of a plurality of filaments for oral care implements, like manual and powered toothbrushes are well known in the art. Generally, the tufts are attached to a mounting surface of a brush head intended for insertion into a user's oral cavity. A grip handle is usually attached to the brush head, which handle is held by the user during brushing. The brush head is either permanently connected or repeatedly attachable to and detachable from the handle.

It is known that filaments forming one tuft often have substantially the same dimensions and characteristics. While toothbrushes comprising these types of tufts clean the outer buccal face of teeth adequately, they are not as well suited to provide adequate removal of plaque and debris from the gingival margin, interproximal areas, lingual surfaces and other hard to reach areas of the mouth.

Tufts composed of two different types of filaments, so called tuft-in-tufts, are also known in the art, e.g. from EP 2 810 582 A1. In general, each type of filament is arranged in a group, wherein an inner group is substantially coaxially enclosed by an outer group to form the tuft. For example, a toothbrush head is known having a bristle surface from which tufts comprising plural filaments extend in a filament direction. Each tuft comprises shorter filaments having a cross section which does not taper from their lower end toward their upper end and greater/longer filaments which taper from their lower end toward their upper end. The longer bristles are surrounded by the shorter bristles.

Toothbrushes comprising a plurality of tufts wherein at least two tufts are inclined in different directions with respect to the mounting surface from which they extend are also known in the art, e.g. from EP 2 810 581 A1. For example, a brush head of a toothbrush is known having tufts which are inclined with respect to the mounting surface in at least two different directions. Each of the tufts comprises a first group of filaments having a first length and at least a second group of filaments having a second length wherein the first length is different from the second length.

While the known brush heads have advantages in certain aspects of cleaning teeth, they may be not as well suited to provide adequate removal of plaque and debris from the gingival margin, interproximal areas, interdental areas, lingual surfaces and other hard to reach areas of the mouth.

It is an object of the present disclosure to provide a brush head for an oral care implement which provides improved cleaning properties, in particular with respect to interdental regions of teeth. It is also an object of the present disclosure to provide an oral care implement comprising such a brush head.

SUMMARY OF THE INVENTION

In accordance with one aspect of the present disclosure, a brush head for an oral care implement is provided comprising at least one (first) group of tufts extending from a mounting surface of a tuft carrier having a rotation axis, the tufts having a base end extending from the mounting surface and a free end. The tufts of the first group are tufts having, in the plane of the mounting surface, an extension in a circumferential direction about the rotation axis which exceeds an extension in a radial direction with respect to the rotation axis. That is, each of the tufts may be arranged in the form of a ring segment on the mounting surface. Further, the tufts of the first group may be inclined with respect to the mounting surface in at least one direction. The inclination has the benefit that, with the mounting surface and the tufts rotating in an oscillating manner during use and the free ends of the filaments contacting e.g. a tooth, the filaments are periodically erected to have a larger distance from the mounting surface and deflected to have a shorter distance from the mounting surface which results in a pulsating increasing and decreasing of the force applied to e.g. a tooth by the filaments of the tuft. This may improve tooth cleaning.

According to the present disclosure, each of the tufts of the first group may comprise a first group of filaments and a second group of filaments with the free ends of the filaments of the second group of filaments protruding beyond the free ends of the filaments of the first group of filaments. This may be achieved by the filaments of the first group of filaments having a first length and the filaments of the second group of filaments having a second length, with the first length being smaller than the second length. A group of filaments may comprise several individual filaments having an identical or at least substantially identical length. There may be more than two groups of filaments. As an alternative or in addition to the filaments of the at least two groups of filaments having different lengths, the feature of the free ends of the filaments of the second group of filaments protruding beyond the free ends of the filaments of the first group of filaments may be achieved by bending, inclining or twisting filaments of the first group of filaments, in an unstressed condition, to a higher degree compared with the filaments of the second group of filaments which may or may not be bent, inclined and/or twisted.

With the at least two groups of filaments of the first group of tufts and with the free ends of the filaments of the second group of filaments protruding beyond the free ends of the filaments of the first group of filaments the tufts of the first group of tufts may have a so-called tuft-in-tuft configuration, i.e., in a section through the tuft in a plane parallel to the mounting surface, one group of filaments encloses a further group of filaments fully or partially. Especially with the longer filaments of the second group of filaments being at least partially surrounded by shorter filaments of the first group of filaments, the surrounding filaments of the first group of filaments may be beneficial in stabilizing and holding the longer filaments of the second group of filaments. Thus, the protruding filaments of the second group of filaments can penetrate into interdental regions, thereby increasing tooth cleaning results.

BRIEF DESCRIPTION OF THE DRAWINGS

FIG. 2 shows in top view components of the brush head of FIG. 1, FIG. 3 shows in a sectional side view details of the brush head of FIG. 1, FIG. 4 shows in a further sectional side view details of the brush head of FIG. 1, FIG. 5 shows in a further sectional view details of the brush head of FIG. 1, and FIG. 6 schematically shows the radial displacement of an inclined but non-twisted tuft.

DETAILED DESCRIPTION OF THE INVENTION

Figure 1:
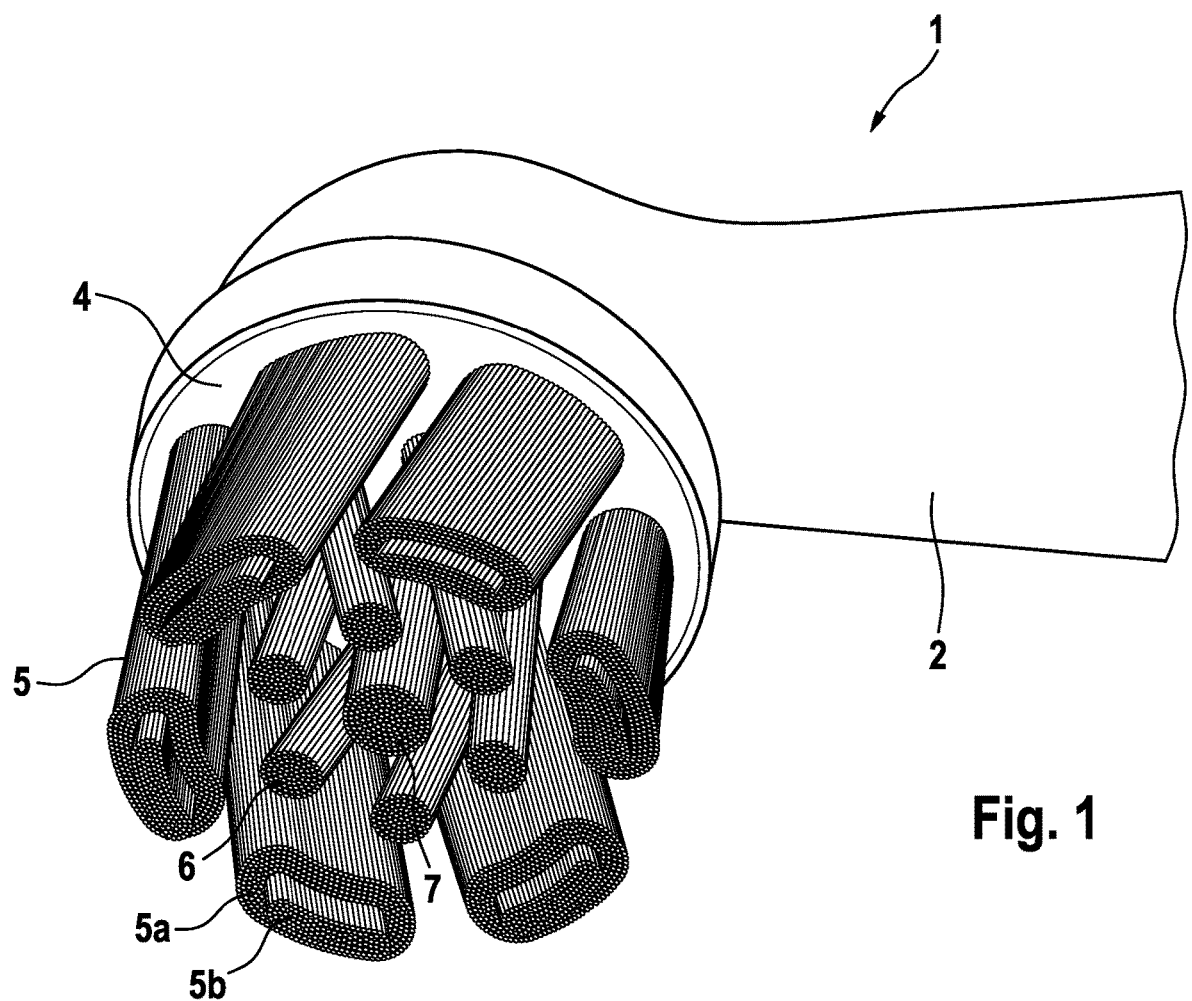
FIG. 1 shows in a schematic perspective view a brush head according to an embodiment of the invention.

Before describing advantageous embodiments of the invention related to the FIGS. 1 to 4, different aspects of the invention are described more in detail. These aspects disclose further features, advantages and possibilities of use of the present invention that might be combined in any useful combination. All features described and/or shown in the drawings are subject matter of the invention, irrespective of the grouping of the features in the claims and/or their back references.

The tufts of the first group are for example disposed on an annular area of the mounting surface of the tuft carrier. With this arrangement of the tufts forming an e.g. circular ring equally good cleaning of large surfaces is improved.

Each tuft of the first group may be inclined with respect to the mounting surface in at least one direction such that, in an unstressed condition, a section through each one of the tufts in a plane, e.g. parallel to the mounting surface, at the free end of the first group of filaments is offset in the circumferential direction from a section through the respective same tuft in the plane of the mounting surface. For example, each tuft of the first group is inclined with respect to the mounting surface by an inclination angle (a) from about 65° to about 80°, optionally from about 70° to about 80°, further optionally from about 74° to about 78°, even further optionally from about 74° to about 75°. In other words, the tufts are inclined with respect to a line perpendicular to the mounting surface by 10° to 25°, e.g. by 16°. The inclination may be in a circumferential direction about the rotation axis and/or in a tangential direction with respect to an imaginary circle on which the tufts are arranged about the rotation axis.

Due to the inclination, some of the filaments may protrude with their free ends from an imaginary circle on which the tufts are arranged about the rotation axis. This broadens the tufted area of the brush head. In some cases, this may be desired for covering a larger cleaning area while keeping the mounting surface relatively small. In other cases, it may be desired to avoid a broadened tufted area, e.g. if the bristles should rather interact with the teeth than with the gums. In the latter case, each tuft of the first group may be twisted such that, in an unstressed condition, a section through the tuft in a plane parallel to the mounting surface at the free end of the first group of filaments is located radially inwards of or is abutting at an imaginary cylinder defined by a circular radially outer edge of the mounting surface and an center axis extending perpendicular to the mounting surface. In this respect, twisting of a tuft is to be understood as comprising any torsion or bending of the free ends of the filaments with respect to the ends attached to the mounting surface, preferably any torsion or bending resulting in the free ends being positioned radially inwards, e.g. towards the rotation axis, and mainly kept within said imaginary cylinder.

The difference in length between the first length of the first group of filaments and the second length of the second group of filaments may be from about 1 mm to about 3 mm, optionally from about 1 mm to about 2 mm, further optionally about 1.5 mm. In addition or as an alternative, the filaments of the first group and the filaments of the second group may differ from each other at least in one of the following characteristics: bending stiffness, diameter, material, texture, cross sectional shape, color and combinations thereof.

For example, the filaments of the first group of filaments are thinner than the filaments of the second group of filaments. With a tuft-in-tuft arrangement, the inner second group of filaments may be thicker and/or stronger (due to a larger filament diameter) than the outer part of the tuft-in-tuft. Thus the tuft can apply sufficient force to remove plaque in interdental regions. Further, because the outer part of the tuft-in-tuft is less stiff and bends easier away, this avoids that this inner part bends away without applying sufficient force.

As an alternative, the filaments of the first group of filaments are thicker than the filaments of the second group of filaments. In other words, a protruding inner tuft (thinner filaments of second group) can penetrate into interdental regions. The second group of filaments may be made thinner/softer (due to a thinner filament diameter) than the outer part of the tuft-in-tuft. Because the outer part of the tuft-in-tuft is stabilizing the inner part and avoids that this inner part bends away without applying sufficient force. Thus, the inner filaments of the second group can apply sufficient force to remove plaque in interdental regions.

The tufts of the first group may be so-called block tufts, i.e. having a block-shaped cross section in a plane parallel to the mounting surface. This shape of the block tufts differs from the usual design of tufts with a circular cross section. In more detail, the block tufts of the first group may have, in a section through the tuft in the plane of the mounting surface, a non-circular shape, optionally an annular segment shape with semi-circular edges, an ellipsoid shape or a prolate ellipsoid shape with flattened long sides.

Due to the rounded outer contour of a tooth, it may be beneficial to adapt the area of a brush head contacting the tooth in use to this shape. For example, at least the filaments of the first group of filaments may have a length and may be arranged such that their free ends lie in a common spherical or cylindrical surface.

According to a further aspect of the present disclosure, the brush head may have at least two groups of tufts extending from the mounting surface of the tuft carrier, wherein the base ends of the tufts of the second group are located radially inwards from the of the base ends tufts of the first group. The brush head may further comprise, located radially inwards of the tufts of the second group, at least one tuft of a third group and/or at least one thermoplastic elastomer element for cleaning and/or massaging the teeth and/or soft tissues of the oral cavity. For example, the tufts of the second group may be arranged on an imaginary circle about the rotation axis. The tufts of the first group of tufts may differ from the tufts of the second group of tufts e.g. in shape. As an example, the tufts of the second and/or third group of tufts may have a circular cross section whereas the tufts of the first group of tufts may be block tufts as mentioned above. This results in an equally good cleaning on large surface and interdental areas.

The tufts of the brush head may be attached to the brush head by means of a hot-tufting process. In more detail, the filaments of a tuft may be received in a cavity of the mounting surface of the tuft carrier and may be fixed in the cavity by melting the filaments into the thermoplastic material of the tuft carrier.

The brush head may comprise one or more tufts comprising a nylon indicator material colored at the outer surface, which is designed such that the coloring on the nylon indicator material is slowly worn away as the tuft is used over time to indicate the extent to which the tuft is worn. For example, the tuft-in-tuft of the first group of tufts consists of indicator filaments in the inner part. For these filaments (wear indicators) the upper portion protrudes over the surrounding filaments. With the, e.g. blue, color fading out, the color of the tip disappears in a first step. I a second step, in case that the indicator filaments are surrounded by filaments that are translucent, the fading out of color results in a visual signal in terms of fading out color of the complete tuft. Thus an improved, two-step wear indicator may be provided.

The present disclosure is further directed to an oral care implement comprising a brush head as defined above.

According to a further independent aspect of the present disclosure, a brush head may comprise large tufts, e.g. block tufts and/or tuft-in-tufts, which are inclined and have a twisted shape. This results in the upper part of the tufts remaining within an imaginary cylinder above the disc-shaped mounting surface such that the upper part of the tufts does not protrude beyond the disc-shaped mounting surface area. This has the advantage that the tufts and/or the tufted area remains compact and avoids a too much broadened tufted area with bristles that would only interact with gums and not on teeth.

According to a further independent aspect of the present disclosure, a brush head may comprise large tufts, e.g. block tufts, having a tuft-in-tuft shape with a protruding inner part of the tufts. This results in the ability of the protruding inner tuft to penetrate into interdental regions. The inner part (second group of filaments) can be thinner/softer (due to thin filament diameter) than the outer part of tuft-in-tuft to apply sufficient force to remove plaque in interdental regions. As the outer part of the tuft-in-tuft is less stiff and bends easier away, this avoids that this inner part bends away without applying sufficient force. Alternatively, the inner part (second group of filaments) can be thicker/stronger (due to large filament diameter) than the outer part of the tuft-in-tuft to apply sufficient force to remove plaque in interdental regions. As the outer part of the tuft-in-tuft is stabilizing the inner part this avoids that this inner part bends away without applying sufficient force. Both alternatives have the advantage of improved interdental cleaning without using thick filaments.

According to a further independent aspect of the present disclosure, a brush head may comprise thick block tufts in an outer ring and a thin tuft in an inner ring on the mounting surface. This results in a broad variety of tuft areas which has the advantage that equally good cleaning on large surfaces (large tufts) and interdental areas (smaller tufts) are provided.

According to a further independent aspect of the present disclosure, a brush head may comprise a very dense bristle field which may be achieved with a specific number of large tufts, namely four to eight tufts, for example six tufts. The resulting highly dense bristle field helps that toothpaste remains longer within brush. This has the advantage that longer lasting paste provides better clean/whitening and improved freshness perception.

Turning now to FIG. 1, a portion of a brush head is shown in a perspective view. The brush head 1 comprises a housing 2 and a tuft carrier 3 having a mounting surface 4 and a rotation axis I extending perpendicular to the mounting surface 4. In the embodiment depicted in FIG. 1 the tuft carrier 3 has a disk shaped mounting surface 4 with a circular circumference and with the rotation axis I being centrally arranged on the mounting surface 4. The tuft carrier 3 is rotatable with respect to the housing 2, e.g. in an oscillating manner, driven by a drive shaft (not shown) located in the housing 2.

The mounting surface 4 carries several tufts, each comprising a number of filaments, which together form a bristle arrangement of the brush head 1. As can be seen in FIGS. 2 to 5 in more detail, a first group of block tufts 5 is arranged on an imaginary outer circular ring about rotation axis I. A second group of tufts 6 is arranged on an imaginary in a circular ring about rotation axis I, i.e. radially inwards of the first tufts 5. A single tuft 7 of the third group is arranged radially inwards of the second tufts 6 on the rotation axis I.

The tufts 5 of the first group of tufts arm block tufts extending over the relatively large area of the mounting surface and 4 and which have, in contrast to tufts 6 and 7, a non-circular cross-section in a section through the tuft parallel to the plane of the mounting surface 4. For example, the tufts 5 of the first group may be about four times larger than the tufts 6 of the second group. In more detail the tufts 5 have an annular segment shape with semi-circular edges. The tufts 5 extend in a circumferential direction about the rotation axis I wherein the extension in the circumferential direction exceeds the extension in a radial direction with respect to the rotation axis I.

Figure 6:
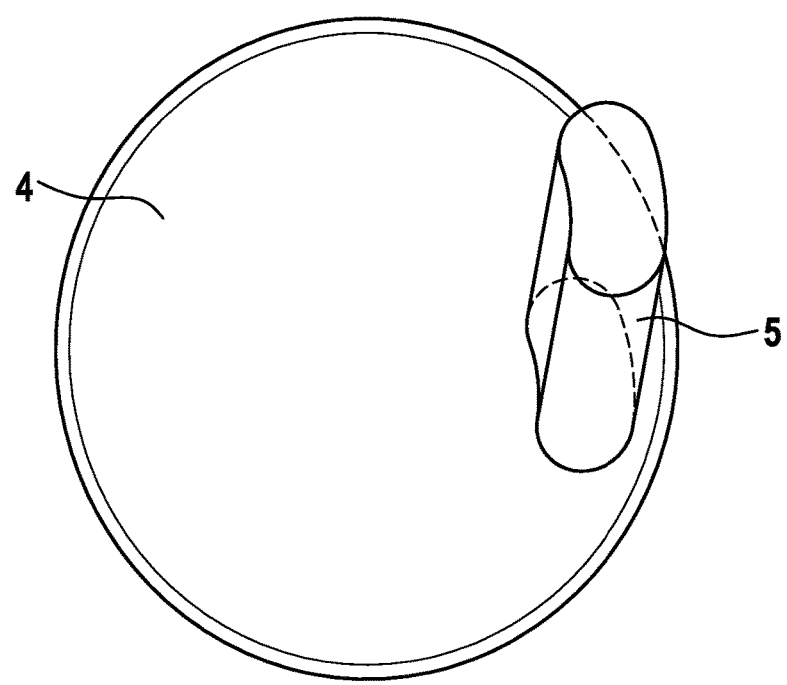

As can be seen in FIGS. 1 to 4, the tufts 5 are inclined with respect to the mounting surface 4 in the circumferential direction. In the depicted embodiment, the tufts 5 are inclined with respect to the mounting surface 4 by about 74° to about 75°. In the depicted embodiment all tufts 5 are inclined in the same direction. However, as an alternative, it may be possible to have some tufts inclined in one direction and other tufts inclined in a different direction, for example in the opposite direction. FIG. 6 shows a single tuft 5 which is inclined in the circumferential direction. The top view of FIG. 6 shows that the outer shape of the free end of the tuft 5, i.e. the end which is facing away from the tuft carrier 3, is offset with respect to the base end of the tuft 5, i.e. the end which is attached to the tuft carrier 3. The inclination of the tuft 5 results in the outer shape of the free end of the tuft partially protruding in a radial direction over the circular shape of the mounting plate 4. This is indicated in FIG. 6 by an arrow. As can be taken from FIG. 6 the inclination of the tufts 5 results in a broadening of the outer circumference of the first group of tufts 5 near the free ends of the filaments compared with the circumference of the tufts 5 near the mounting plate 4.

The latter effect of broadening of the circumference may be undesired in some cases. In the embodiment depicted in FIGS. 1 to 5, in addition to the inclination, the tufts 5 are twisted such that the free ends of the filaments are located closer to the rotation axis I compared with the non-twisted configuration as depicted in FIG. 6. In more detail, the tufts 5 of the first group are twisted such that, in an unstressed condition, a section through the tuft in a plane parallel to the mounting surface 4 at the free end of the filaments is located radially inwards of or is abutting at an imaginary cylinder defined by the circular radially outer edge of the mounting surface 4 and the rotation axis I as a center axis extending perpendicular to the mounting surface 4. In other words, the tufts 5 of the first group can be twisted such that, in a plan view (or a plane parallel to the mounting surface 4 at the free end of the filaments), the base ends of the tufts 5 are respectively offset relative to the free ends of the tufts 5—or, stated differently, the base ends of the tufts 5 are not congruent with the free ends of the tufts 5 when the base end and the free end of each of the tufts are projected onto one another along the tuft's longitudinal axis.

The tufts 5 of the first group of tufts are further designed as a so-called tuft-in-tuft with a first group of filaments 5a and a second group of filaments 5b. The filaments 5b of the second group are located at a central position of the tuft 5 and are surrounded by the filaments 5a of the first group. In the embodiment depicted in FIGS. 1 to 5, the filaments 5a of the first group have a first length and the filaments 5b of the second group have a second length which exceeds the first length. In other words, the filaments 5b of the second group at least partially protrude with their free ends beyond the free ends of the filaments 5a of the first group in a direction facing away from the mounting surface 4. In the depicted embodiment, the first length may differ from the second length by e.g. about 1.5 mm the increased length of the filaments 5b is for example useful for improved interdental cleaning. The filaments 5a of the first group may stabilize the filaments 5b of the second group, thereby preventing that the filaments 5b of the second group bend away without applying sufficient force for interdental cleaning.

The filaments 5a of the first group may differ from the filaments 5b of the second group not only in length but in addition in bending stiffness, in diameter, in material, in texture, in cross sectional shape and/or in color. For example, the filaments 5b of the second group may comprise a nylon indicator material colored at the outer surface, which is designed such that the coloring on the nylon indicator material is slowly worn away as the tuft 5 is used over time to indicate the extent to which the tuft is worn. Further, in the embodiment depicted in the Figures, the block tufts 5 of the first group have the relatively dense bristle field which retains toothpaste relatively long within the brush.

As is best shown in FIGS. 1, 2, and 5, each of the tufts 5 of the first group has, in a plane of the mounting surface (4), has a geometric shape of a curved stadium. As a skilled artisan would readily recognize, "stadium" (AKA "obround") shape is a two-dimensional geometric shape constructed of a rectangle with semicircles at two mutually opposite sides. The curved stadium of the tuft of the first group 5 has an inner side facing the rotation axis (I) and an outer side opposite to the inner side and facing the circumferential edge of the mounting surface (4). Thus, the stadium's inner side is curved concavely while the stadium's outer side is curved convexly. The curved stadium has a circumferentially extending extension, which extends about the rotation axis (I), and a radial extension, which extends in a radial direction. The circumferential extension is greater than the radial extension. As is also shown in FIGS. 1, 2, and 5, the tuft-in-tuft configuration, previously described, includes the first group of filaments 5a, which forms an outer tuft, and the second group of filaments 5b (surrounded by the first group of filaments 5a), which forms an inner tuft. Both the outer tuft and the inner tuft, when viewed in a cross-section parallel to the mounting surface, have a shape of the concave stadium, wherein the outer tuft fully encompasses/surrounds the inner tuft.

The tufts 6 of the second group have a circular cross-section in a plane parallel to the mounting surface 4 as shown in FIG. 5. The tufts 6 may be inclined as indicated in FIGS. 1 to 4 in a circumferential direction or may extend substantially perpendicular to the mounting surface 4 like the central tuft 7. In the depicted embodiment the number of the first tufts 5 is the same as the number of the second tufts 6, namely six. Further, the second tufts 6 are arranged offset with respect to the first tufts 5 in a circumferential direction such that the second tufts 6 are each located at a circumferential position corresponding to a space between two adjacent first tufts 5.

The filaments 5a, 5b of the first group of tufts 5 may differ from the filaments of the second group of tufts 6 and/or the third tuft 7 for example in length, in bending stiffness, in diameter, in material, in texture, in cross sectional shape and/or in color. Thus, the tufts may have different functions like cleaning large surfaces compared to cleaning interdental areas.

FIGS. 1, 3 and 4 show that the filaments of the first tufts 5 and the second tufts 6 are trimmed such that their free ends lie in a common spherical or cylindrical surface which is indicated by the radius R30 in FIGS. 3 and 4. This improves adaption of the bristle field with respect to the outer contour of a tooth.

The tuft carrier 3 is provided with several cavities 8 in the mounting surface 4. The respective tufts 5, 6, 7 are inserted in the cavities 8 during the manufacturing of the brush head 1 and are fixed in the tuft carrier 3 by hot tufting. The tuft carrier 3 is further provided with the coupling 9 for transmitting and/or generating an oscillating rotary movement of the tuft carrier 3 with respect to the housing 2

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

REFERENCE NUMERALS 1 brush head
2 housing
3 tuft carrier
4 mounting surface
5 tuft of the first group of tufts
5a filament of first group of filaments
5b filament of second group of filaments
6 tuft of second group of tufts
7 tuft of third group of tufts
8 cavity
9 coupling
I rotation axis

What is claimed is:

1. A brush head (1) for a powered oral-care implement comprising:
   a plurality of tufts (5, 6, 7) extending from a mounting surface (4) of a tuft carrier (3), the mounting surface having a circumferential edge and a rotation axis (I) extending substantially perpendicular to the mounting surface, each of the plurality of tufts (5, 6, 7) having a base end adjacent to the mounting surface (4) and a free end opposite to the base end, the plurality of tufts comprising at least a first group of tufts,
   wherein the tufts of the first group are disposed on an annular portion of the mounting surface (4) adjacent to the circumferential edge thereof, wherein each of the tufts (5) of the first group has, in a plane of the mounting surface (4), a geometric shape of a curved stadium having an inner side facing the rotation axis (I) and an outer side opposite to the inner side and facing the circumferential edge of the mounting surface, wherein the inner side is curved concavely and the outer side is curved convexly, wherein the curved stadium has a circumferentially shaped extension extending in a circumferential direction about the rotation axis (I) and a radial extension extending in a radial direction, and wherein the circumferential extension exceeds the radial extension,
   wherein the tufts (5) of the first group are inclined with respect to the mounting surface (4) in at least one direction,
   wherein each of the tufts (5) of the first group comprises a first group of filaments (5a) having a first length and a second group of filaments (5b) having a second length greater than the first length, and wherein the filaments (5b) of the second group have free ends protruding beyond free ends of the filaments (5a) of the first group of filaments,
   wherein at least some of the tufts (5) of the first group of filaments (5a) have a tuft-in-tuft configuration comprising an outer tuft surrounding an inner tuft, so that the filaments of the first group form the outer tuft and the filaments of the second group form the inner tuft,
   and wherein both the outer tuft and the inner tuft, in a cross-section parallel to the mounting surface, have the geometric shape of the concave stadium.

2. The brush head according to claim 1, wherein each of the tufts (5) of the first group is inclined with respect to the mounting surface (4) in at least one direction such that, in an unstressed condition, a section through each of the tufts (5) in a plane parallel to the mounting surface (4) at the free end of the first group of filaments (5a) is offset in the circumferential direction from a section through the same tuft (5) in the plane of the mounting surface (4).

3. The brush head according to claim 2, wherein each of the tufts (5) of the first group is inclined with respect to the mounting surface (4) by an inclination angle from about 65° to about 80°.

4. The brush head according to claim 3, wherein each of the tufts (5) of the first group is inclined with respect to the mounting surface (4) by an inclination angle from about 70° to about 80°.

5. The brush head according to claim 3, wherein each of the tufts (5) of the first group is inclined with respect to the mounting surface (4) by an inclination angle from about 74° to about 78°.

6. The brush head according to claim 3, wherein each of the tufts (5) of the first group is inclined with respect to the mounting surface (4) by an inclination angle from about 74° to about 75°.

7. The brush head according to claim 1, wherein each of the tufts (5) of the first group is twisted such that, in an unstressed condition, a section through the tuft (5) in a plane parallel to the mounting surface (4) at the free end of the first group of filaments (5a) is located radially inwards of, or is abutting, an imaginary cylinder defined by the circumferential edge of the mounting surface (4) and the rotation axis (I).

8. The brush head according to claim 1, wherein the difference between the first length and the second length is from about 1 mm to about 3 mm.

9. The brush head according to claim 8, wherein the difference in length between the first length and the second length is from about 1 mm to about 2 mm.

10. The brush head according to claim 8, wherein the difference in length between the first length and the second length is about 1.5 mm.

11. The brush head according to claim 1, wherein the filaments (5a) of the first group differ from the filaments (5b) of the second group in at least one of characteristics selected from the group consisting of bending stiffness, diameter, material, texture, cross-sectional shape, color, and any combination thereof.

12. The brush head according to claim 1, wherein the filaments (5a) of the first group of filaments are thinner than the filaments (5b) of the second group of filaments.

13. The brush head according to claim 1, wherein the filaments (5a) of the first group of filaments are thicker than the filaments (5b) of the second group of filaments.

14. The brush head according to claim 1, wherein at least the filaments (5a) of the first group of filaments have their free ends lie in a common spherical or cylindrical surface.

15. The brush head according to claim 1, wherein the brush head has a second group of tufts extending from the mounting surface (4) of the tuft carrier (3), wherein the base ends of the tufts (6) of the second group are located radially inwards from the base ends of the tufts (5) of the first group.

16. The brush head according to claim 15, wherein the brush head has at least one tuft (7) of a third group disposed radially inwards from the tufts of the second group.

17. The brush head according to claim 16, wherein the at least one tuft (7) of a third group comprises a thermoplastic elastomer.

18. The brush head according to claim 1, wherein the tufts (5, 6, 7) are attached to the tuft carrier (3) by means of a hot-tufting process.

19. The brush head according to claim 1, wherein the tufts (5) of the first group are twisted such that, in a plan view, the base ends of the tufts (5) are respectively offset relative to the free ends of the tufts.

20. The brush head according to claim 1, wherein the tufts (5) of the first group are inclined in at least one circumferential direction with respect to the mounting surface.

21. An oral-care implement comprising a brush head (1) according to claim 1.

* * * * *